(12) United States Patent
Juang et al.

(10) Patent No.: US 11,922,310 B1
(45) Date of Patent: Mar. 5, 2024

(54) FORECASTING ACTIVITY IN SOFTWARE APPLICATIONS USING MACHINE LEARNING MODELS AND MULTIDIMENSIONAL TIME-SERIES DATA

(71) Applicant: INTUIT INC., Mountain View, CA (US)

(72) Inventors: Bor-Chau Juang, Santa Clara, CA (US); Eyal Shafran, Salt Lake City, UT (US); Pratyush Kumar Panda, Livermore, CA (US); Divya Beeram, Fremont, CA (US); Linxia Liao, Palo Alto, CA (US); Nicholas Johnson, Tucson, AZ (US); Christiana Mei Hui Chen, San Francisco, CA (US)

(73) Assignee: Intuit, Inc., Mountain View, CA (US)

( * ) Notice: Subject to any disclaimer, the term of this patent is extended or adjusted under 35 U.S.C. 154(b) by 0 days.

(21) Appl. No.: 18/194,018

(22) Filed: Mar. 31, 2023

(51) Int. Cl.
  *G06N 3/08* (2023.01)
(52) U.S. Cl.
  CPC .................................... *G06N 3/08* (2013.01)

(58) Field of Classification Search
  CPC ............ G06N 3/02; G06N 3/04; G06N 3/045; G06N 3/0464; G06N 3/049; G06N 3/08; G06N 3/098; G06N 20/00; G06N 20/10; G06N 20/20
  See application file for complete search history.

(56) References Cited

U.S. PATENT DOCUMENTS

| | | | |
|---|---|---|---|
| 10,885,167 B1 * | 1/2021 | Lador | G06F 21/554 |
| 2017/0220939 A1 * | 8/2017 | Bansal | G06N 5/04 |
| 2020/0084255 A1 * | 3/2020 | McLoughlin | H04L 65/60 |
| 2022/0058499 A1 * | 2/2022 | Amzal | G06N 20/00 |

* cited by examiner

*Primary Examiner* — Shane D Woolwine
(74) *Attorney, Agent, or Firm* — Patterson + Sheridan, LLP

(57) ABSTRACT

Certain aspects of the present disclosure provide techniques for predicting activity within a software application using a machine learning model. An example method generally includes generating a multidimensional time-series data set from time-series data associated with activity within a software application. The multidimensional time-series data set generally includes the time-series data organized based on a plurality of time granularities. Using a machine learning model and the generated multidimensional time-series data set, activity within the software application is predicted for one or more time granularities of the plurality of time granularities. Computing resources are allocated to execute operations using the software application based on the predicted activity within the software application.

17 Claims, 5 Drawing Sheets

FIG. 2

FORECASTING ACTIVITY IN SOFTWARE APPLICATIONS USING MACHINE LEARNING MODELS AND MULTIDIMENSIONAL TIME-SERIES DATA

INTRODUCTION

Aspects of the present disclosure relate to forecasting activity in software applications and allocating computing resources based on the forecasted activity.

BACKGROUND

Software applications are generally deployed for use by many users for the performance of a specific function. These applications may be deployed, for example, as web applications accessible over a network, such as the Internet or a private network, or as desktop applications that include static components executed from a local device and dynamic components executed from content retrieved from a network location. These applications can include financial applications, such as tax preparation applications, accounting applications, personal or business financial management applications; social media applications; electronic communications applications; and so on. These software applications generally include help functions that users frequently interact with to obtain information about how to perform various tasks within the software application. Some applications may additionally provide execution environments for the use of third-party plugins, extensions, helpers, and other components to add functionality to these applications. These components may be available for users to download or otherwise link to an instance of a software application through an application store.

Usage patterns within a software application, represented as time-series data, may include information that can be used to predict future user activity with respect to the software application. For example, usage patterns of features in the software application may be predictive of various events related to the software application, such as discontinuing use of the software application, changing subscriptions to obtain access to additional features in the software application, connecting external applications to the software application, and the like. In another example, usage patterns of features in the software application may also be predictive of the types of content with which the user may be interested in interacting (e.g., help content, other explanatory information, etc.).

Time-series data used to train machine learning models to forecast activity within a software application is generally noisy in nature. However, while the data may be noisy, some patterns may be repeated over a certain periodicity. These patterns may reflect, for example, seasonality in the usage of software applications. However, machine learning models trained using time-series data may not be able to recognize these patterns and may not be able to recognize whether fluctuations in the time-series data represent temporary or permanent changes in usage activity within the software application.

Accordingly, techniques are needed for improved event prediction.

BRIEF SUMMARY

Certain embodiments provide a computer-implemented method for predicting activity within a software application using a machine learning model. An example method generally includes generating a multidimensional time-series data set from time-series data associated with activity within a software application. The multidimensional time-series data set generally includes the time-series data organized based on a plurality of time granularities. Using a machine learning model and the generated multidimensional time-series data set, activity within the software application is predicted for one or more time granularities of the plurality of time granularities. Computing resources are allocated to execute operations using the software application based on the predicted activity within the software application.

Certain embodiments provide a computer-implemented method for training a machine learning model to predict activity within a software application. An example method generally includes generating a multidimensional time-series data set from time-series data associated with activity within a software application. The multidimensional time-series data set generally includes the time-series data organized based on a plurality of time granularities. A machine learning model is trained to predict future activity within the software application for one or more time granularities of the plurality of time granularities based on the generated multidimensional time-series data set. The machine learning model is deployed.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 2 illustrates an example of multidimensional time-series data used to train a machine learning model to predict activity within a software application across a plurality of time granularities, in accordance with aspects of the present disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
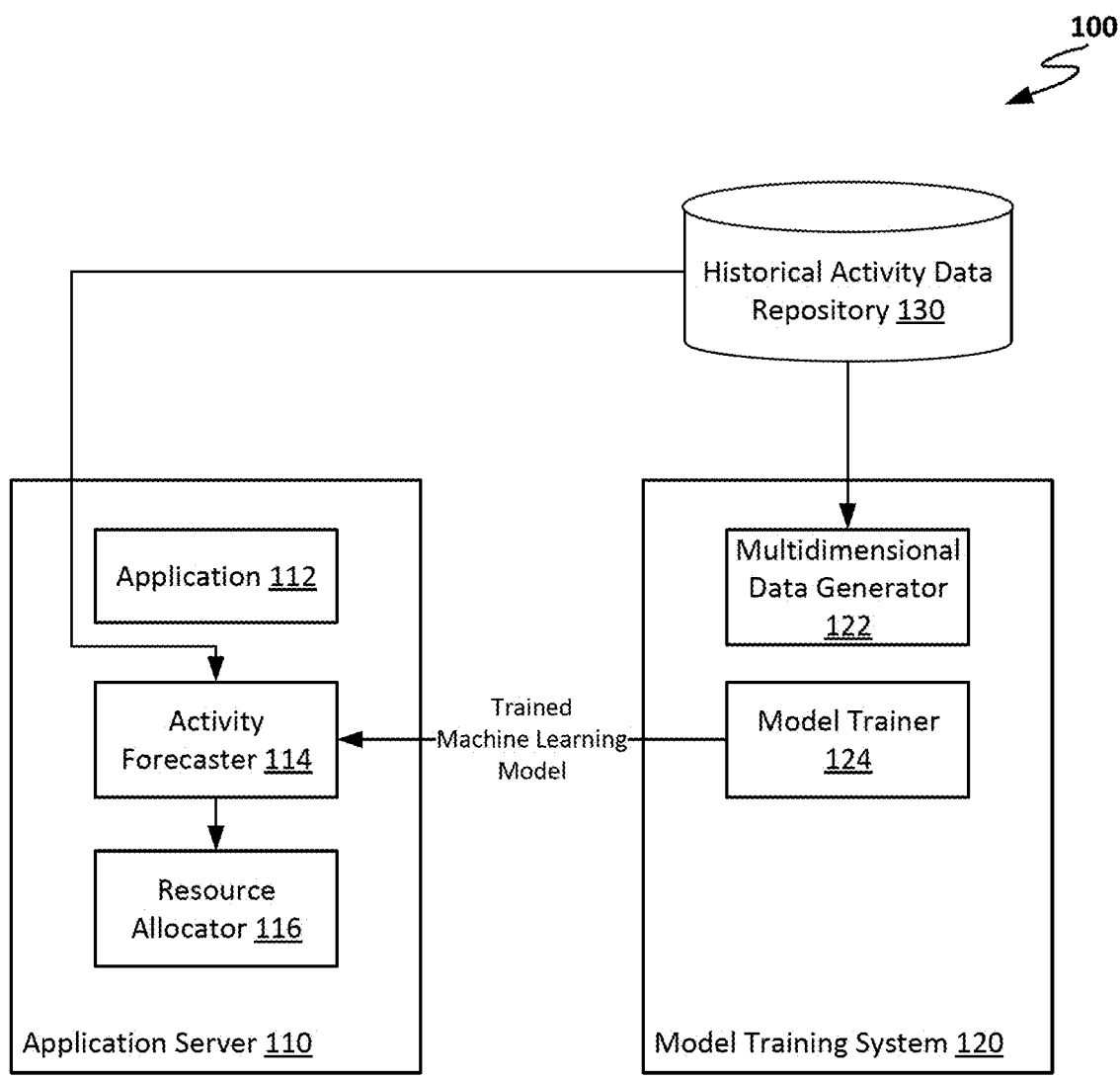
FIG. 1 illustrates an example system in which a machine learning model is trained and used to predict activity within a software application based on multidimensional time-series data, in accordance with aspects of the present disclosure.

Aspects of the present disclosure provide apparatuses, methods, processing systems, and computer-readable mediums for predicting activity within a software application using machine learning models trained using multidimensional time-series data.

Generally, historical user activity data related to actions performed within a software application is used to train predictive models to predict the likelihood of an event occurring in a software application. The historical user activity data may generally include information about the action performed within the software application and a time at which the user performed the action within the software application. This historical user activity data may thus be represented as one-dimensional data including timestamps associated with each time a specific action was performed within the software application.

While historical user activity data, organized as one-dimensional time-series data, can be used to train machine learning models to predict activity within a software application, machine learning models trained using one-dimensional time-series data may not accurately predict activity within the software application due to various factors. For example, these machine learning models may not be able to differentiate between noise in the one-dimensional time-series data and actual changes in activity patterns within the software application (e.g., due to users of the software application using different features of the software application, increases in the number of users using the software application, or the like). Further, for some software applications, the time-series data may exhibit seasonal usage patterns which a machine learning model may not be able to recognize. For example, in a tax preparation application, seasonal usage patterns may show spikes in system utilization when users of the software application receive various tax forms and in the days preceding a deadline for filing tax returns. However, a machine learning model trained using one-dimensional time-series data may not be able to recognize these spikes in activity with the software application as seasonal spikes.

Aspects of the present disclosure provide techniques for training and using machine learning models to predict activity within a software application based on multidimensional time-series data. As discussed in further detail herein, these machine learning models may leverage information according to different time granularities in one-dimensional time-series data in predicting activity within the software application. By training and using multidimensional time-series data, aspects of the present disclosure may allow for more accurate prediction of activity within a software application across different time granularities and different periods of time. Further, these machine learning models may be trained to accurately predict activity within the software application, taking into account seasonality trends in the historical data used to train these machine learning models. By training and using machine learning models to predict activity within a software application based on multidimensional time-series data, aspects of the present disclosure may accurately predict activity within the software application and thus may allow for an allocation of computing resources (e.g., processing capabilities, memory, network bandwidth, and the like) to the software application that is appropriate for the predicted amount of activity within the software application. This may, thus, minimize the amount of resources allocated to the software application in excess of what is needed to execute operations within the software application according to a desired level of performance and may allow for sufficient resources to be allocated to execute operations within the software application according to the desired level of performance. Thus, performance within the software application may be maintained at the desired level of performance while minimizing wasted resources which can otherwise be allocated to other operations, thereby also improving the functioning of computing systems involved.

Example Activity Prediction Using Multidimensional Time-Series Data

FIG. 1 illustrates an example environment 100 in which a machine learning model is trained and used to predict activity within a software application based on multidimensional time-series data, according to aspects of the present disclosure. As illustrated, environment 100 includes an application server 110, a model training system 120, and historical activity data repository 130.

Application server 110 is generally representative of any computing system which can host an application accessed by external client devices and can offload various computing tasks, such as data storage or other processing tasks (e.g., training of machine learning models, inference using machine learning models, compute-intensive data analysis operations, etc.), to a remote service 120. These computing systems can include server computers, cloud compute instances, or the like. As illustrated, application server 110 hosts an application 112, activity forecaster 114, and resource allocator 116.

Application 112 generally receives requests to execute various operations from client devices served by application server 110. These requests, for example, may include requests to invoke support sessions within the software application for which resources are to be allocated. These support sessions may include, for example, automated support sessions (e.g., support sessions with a chatbot or other automated systems that can attempt to answer queries from users of application 112), live chat sessions hosted by application 112, voice and/or video calls serviced by call centers, and the like. Generally, as application 112 receives requests to execute operations from client devices served by application server 110, application 112 can use resources allocated by resource allocator 116 to process these requests.

Activity forecaster 114 generally uses a machine learning model (e.g., trained by model training system 120, as discussed in further detail below) and multidimensional time-series data to predict activity within a software application for one or more time granularities of a plurality of time granularities. The predicted activity may also be referred to as intraday activity, representing expected activity within the software application within different portions of a day, based on an assumption that activity within the software application varies across different portions of a day with more activity occurring when most users of the software application are active and less activity occurring when most users of the software application are inactive (e.g., at night, during work hours, etc.). For example, the predicted activity may be predicted for different 30 minute windows within a day (e.g., a 30-minute time granularity). The granularity of the time windows over which activity within the software application is predicted, however, may be any amount of time appropriate for the application and the activity within the application, and this granularity may be selected a priori based on an amount of time in which an activity may be expected to be performed within the software application (e.g., the average duration of a live chat session or other interaction with live support agents supporting users of application 112).

To predict future activity within the application 112 using multidimensional time-series data, historical user activity data within the application 112 (e.g., stored in historical activity data repository 130) may be retrieved and transformed from one-dimensional time-series data to multidimensional time-series data. Generally, the historical user activity data within the application 112 may be retrieved as a set of timestamps identifying when an activity was performed within the application 112 (e.g., times at which live support sessions were initiated within the application 112 for a machine learning model trained to predict when users of the software application invoke live support sessions). To allow a machine learning model to recognize intraday activity patterns and to recognize seasonal patterns, the historical time-series data may be organized into multiple data sets, with each data set being associated with a different intraday time granularity and including featurized data generated based on the date on which activity data was captured. For example, to allow for activity to be predicted to take into account seasonality within usage trends for application 112 (or particular features exposed by application 112), the featurized data, for each day in the multidimensional time-series data, may include information identifying the day of the week (since it may be assumed that activity within the software application differs between weekdays, weekend days, weekdays that are bank holiday days, etc.), the part of the month in which the day is located, and the month in which the day is located.

To generate time-series data for each of the plurality of time granularities, the one-dimensional time-series data may be divided into a plurality of bins. Each bin may be associated with a period of time, according to the time granularity for which time-series data is generated, within a larger time period. For example, for a 30 minute time granularity, the time-series data for any given day within the historical user activity data may be divided into 48 bins of non-overlapping 30-minute time windows. For a 60 minute time granularity, the time-series data for any given day within the historical user activity data may be divided into 24 bins of non-overlapping 60-minute time windows. The data associated with each bin may be, for example, the percentage of daily activity in the application 112 occurring during a time window associated with each bin (e.g., activity initiated within the time window).

Generally, the multidimensional time-series data may be three-dimensional data. A first dimension in the three-dimensional data set may be associated with a daily time window. A second dimension in the three-dimensional data set may be associated with a time granularity for organizing the time-series data. A third dimension in the three-dimensional data set may be associated with the plurality of time granularities over which data is to be divided and analyzed by the machine learning model to predict intraday activity within the software application. That is, along the first dimension, data may be divided into data from different days. Along the second dimension, data for each day may be divided into bins having a specific time granularity. Finally, along the third dimension, the time-series data may be organized across different time granularities (e.g., according to a 15-minute time granularity, a 30-minute time granularity, a 60-minute time granularity, etc.).

The machine learning model deployed at activity forecaster 114 may use the multidimensional time-series data to predict future activity within the software application. The future activity may be predicted, for example, across different time windows for one or more larger time periods in the future. For example, the predicted future activity may include predictions of future activity for each of a plurality of time windows for a succeeding day (e.g., if a prediction is generated on day D, the prediction may be for activity expected to occur within the software application on day D+1). Generally, the predicted activity may include a total amount of activity predicted to occur on the succeeding day (e.g., the predicted number of live support sessions initiated by users of application 112) and a percentage of that activity predicted to occur during each time window during the succeeding day. The duration of the time window may be selected for the application 112 based on various factors, such as an average amount of time spent executing a particular action within application 112.

Resource allocator 116 generally uses the predicted future activity generated by activity forecaster 114 to allocate computing resources to application 112. Generally, the total amount of resources allocated to application 112 by resource allocator 116 may be defined based on an average amount of resources consumed in order to perform an action within application 112 and the total number actions predicted to be performed over a specific time period (e.g., within the next day). For each time window, resource allocator 116 can partition the total amount of resources allocated to application 112 into different batches of resources. Each batch of resources may be associated with a specific bin (or time window) and may be calculated based on the total amount of resources allocated to application 112 and the percentage of activity expected to be performed during the time period associated with that specific bin. For example, if 100 units of a computing resource are allocated to application 112, and five percent of the total activity within application 112 is expected to be performed during a time window, five of the 100 units of the computing resource may be allocated to application 112 during that time window. Generally, resource allocator 116 may allocate an initial amount of resources and then allocate additional resources or deallocate allocated resources as the day progresses from one time window to another. In doing so, resource allocator 116 can allocate a smaller amount of resources to application 112 than the total amount of resources expected to be used by application 112 during any given day. The peak amount of resources allocated to application 112 at any given point in time may be significantly smaller than the total amount of resources, according to the predicted amount of activity within application 112.

Model training system 120 is generally representative of any computing system which can train and deploy a machine learning model to predict activity within a software application based on multidimensional time-series data. As illustrated, model training system 120 includes a multidimensional data generator 122 and a model trainer 124.

Multidimensional data generator 122 is generally configured to generate a training data set of multidimensional time-series data from historical one-dimensional time-series data representing activity within application 112. The historical time-series data may be organized into multiple data sets, with each data set being associated with a different intraday time granularity and including featurized data generated based on the date on which activity data was captured. The featurized data, for each day in the multidimensional time-series data, may include information identifying the day of the week (since it may be assumed that activity within the software application differs between weekdays, weekend days, weekdays that are bank holiday days, etc.), the part of the month in which the day is located, and the month in which the day is located.

To generate time-series data for each of the plurality of time granularities, the one-dimensional time-series data may be divided into a plurality of bins. Each bin may be associated with a period of time, according to the time granularity for which time-series data is generated, within a larger time period. For example, for a 30 minute time granularity, the time-series data for any given day within the historical user activity data may be divided into 48 bins of non-overlapping 30-minute time windows. For a 60 minute time granularity, the time-series data for any given day within the historical user activity data may be divided into 24 bins of non-overlapping 60-minute time windows. The data associated with each bin may be, for example, the percentage of daily activity in the application 112 occurring during a time window associated with each bin (e.g., activity initiated within the time window).

Generally, the multidimensional time-series data may be three-dimensional data. A first dimension in the three-dimensional data set may be associated with a daily time window. A second dimension in the three-dimensional data set may be associated with a time granularity for organizing the time-series data. A third dimension in the three-dimensional data set may be associated with the plurality of time granularities over which data is to be divided and analyzed by the machine learning model to predict intraday activity within the software application. That is, along the first dimension, data may be divided into data from different days. Along the second dimension, data for each day may be divided into bins having a specific time granularity. Finally, along the third dimension, the time-series data may be organized across different time granularities (e.g., according to a 15-minute time granularity, a 30-minute time granularity, a 60-minute time granularity, etc.). In some aspects, the multidimensional time-series data may be effectively organized into a plurality of feature maps, with each map corresponding to a respective time granularity of the plurality of time granularities.

Model trainer 124 generally uses the multidimensional time-series data set generated by multidimensional data generator 122 to train a machine learning model to predict (intraday) activity within application 112. In some aspects, the machine learning model may be a convolutional neural network (CNN). The CNN may be trained to predict future activity within the software application based on the plurality of time granularities being one dimension in the multidimensional time-series data set. In some aspects, multidimensional time-series data set may be processed by the CNN similarly to three-dimensional vision data. The CNN may thus be trained to account for relationships between activity across different time granularities, using cross-learning techniques. In some aspects, the CNN may use additional data dimensionality to reinforce the cross-learning process (e.g., to discover relationships between different types of activity within application 112, etc.). In such a case, the multidimensional time-series data set may include data for other activity within application 112, which may be useful in predicting resource utilization for related activity within application 112 (e.g., related activity having high resource requirements, such as computationally expensive or resource-intensive operations involving computing resources and/or human resources to satisfy).

Example Multidimensional Time-Series Data

Figure 2:
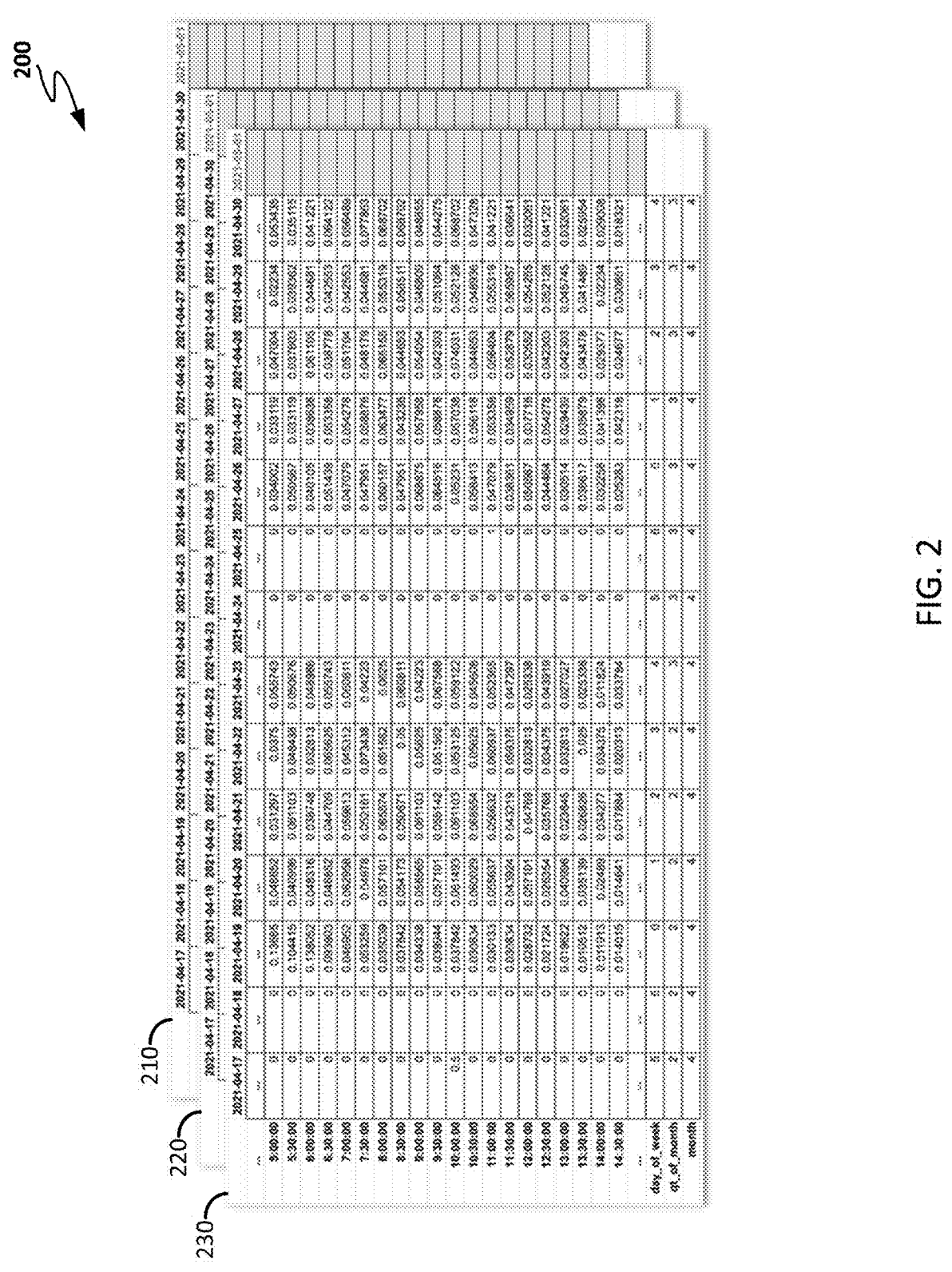

FIG. 2 illustrates an example 200 of multidimensional time-series data used to train a machine learning model to predict activity within a software application across a plurality of time granularities, in accordance with aspects of the present disclosure. As illustrated example 200 includes three sets 210, 220, and 230 of time-series data; however, it should be understood that a multidimensional time-series data set may include any number of different data sets organized into time windows having different granularities.

Each set 210, 220, 230 of time-series data may be organized into a two-dimensional data set including featurized data for each time window during a larger time period (e.g., a n minute time window within a specific day). The featurized data set may include, for example, a percentage of activity within a day occurring within a specific time window, as well as featurized data describing the day relative to its position within larger time periods (e.g., the day of the week, the week of a month (or year), etc.). For example, as illustrated, data sets 210, 220, and 230 may include time-series data for the time period spanning Apr. 17, 2021 through Apr. 30, 2021. In data set 230, each day in this time period may be divided into a plurality of non-overlapping 30-minute windows. During weekend days, represented by day_of_week indices 5 and 6, it may be seen that these days are associated with less varied activity over the different time windows than weekday days, represented by day_of_week indices 0 through 4.

Each set 210, 220, 230 of time-series data may be associated with different time granularities. For example, set 230 illustrates time-series data divided into non-overlapping 30-minute windows. Meanwhile, sets 210 and 220 may be divided into non-overlapping windows of different sizes than set 230. For example, set 210 may be divided into a plurality of non-overlapping 15 minute windows, while set 220 may be divided into a plurality of non-overlapping 60 minute windows. It should be recognized by one of ordinary skill in the art that these time window lengths are provided for illustrative purposes, and time windows of any size may be used to generate different two-dimensional data sets in a multidimensional data set used in training a machine learning model to predict activity within a software application and predicting activity within the software application using the trained machine learning model.

Figure 3:
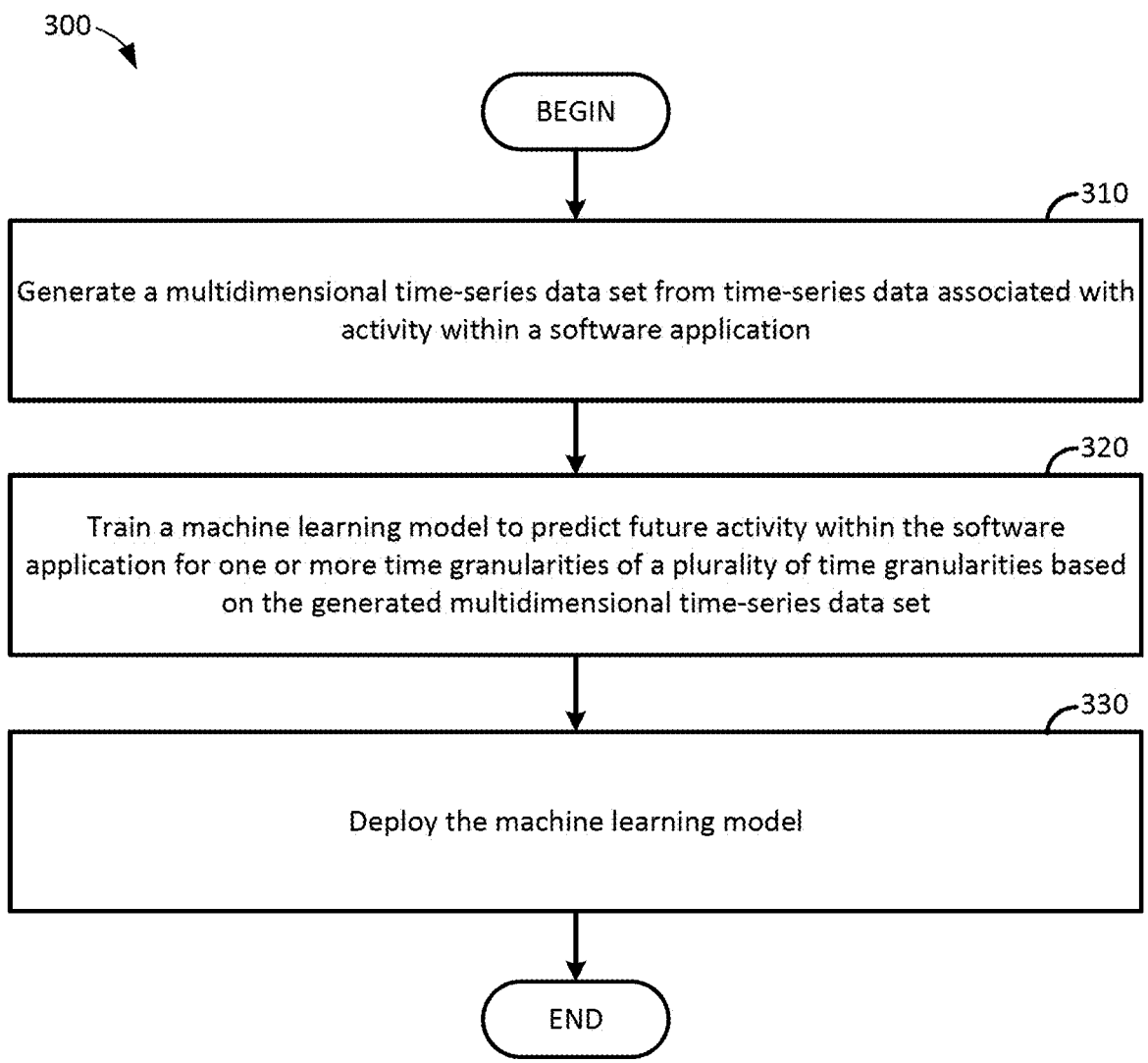
FIG. 3 illustrates example operations that may be performed by a computing system to train a machine learning model to predict activity within a software application based on multidimensional time-series data, in accordance with aspects of the present disclosure.

Example Computer-Implemented Method for Activity Prediction Using Multidimensional Time-Series Data FIG. 3 illustrates example operations 300 for training a machine learning model to predict activity within a software application based on multidimensional time-series data, in accordance with aspects of the present disclosure. Operations 300 may be performed by a model training system, such as model training system 120 illustrated in FIG. 1.

As illustrated, operations 300 begin at block 310, with generating a multidimensional time-series data set from time-series data associated with activity within a software application. Generally, the multidimensional time-series data set includes the time-series data organized based on a plurality of time granularities.

In some aspects, generating the multidimensional time-series data set may include partitioning the time-series data (which, as discussed above, may be one-dimensional time-series data including timestamps identifying when a specific action was invoked or otherwise performed within the software application) into a plurality of bins. Each bin may be associated with a period of time, according to a specific time granularity of the plurality of time granularities, within a larger time period. For example, as discussed above, each bin may be associated with a non-overlapping 30 minute window within a day, which may allow for a machine learning model to predict future activity within the software application on an intra-day and inter-day basis.

In some aspects, the multidimensional time-series data set may be structured as a three-dimensional data set. A first dimension in the three-dimensional data set may be associated with a daily time window. A second dimension in the three-dimensional data set may be associated with a time granularity for organizing the time-series data. A third dimension in the three-dimensional data set may be associated with the plurality of time granularities over which data is to be divided and analyzed by the machine learning model to predict intraday activity within the software application. In some aspects, data for each day in the daily time window may be associated with a plurality of features identifying a position of a day relative to one or more larger time windows. For example, the data for each day in the daily time window may include an index identifying the day of the week (e.g., as illustrated in FIG. 2, with Monday through Friday indexed as days 0 through 4, inclusive, and Saturday and Sunday indexed as days 5 and 6), an index identifying the week of the month in which the day is located, and an identifier of the month.

In some aspects, the multidimensional time-series data set comprises a plurality of feature maps, each feature map of the plurality of feature maps corresponding to a respective time granularity of the plurality of time granularities.

Operations 300 proceed to block 320, with training a machine learning model to predict future activity within the software application for one or more time granularities of the plurality of time granularities based on the generated multidimensional time-series data set.

In some aspects, the machine learning model comprises a convolutional neural network trained to predict future activity within the software application based on the plurality of time granularities being one dimension in the multidimensional time-series data set.

In some aspects, to train the machine learning model, the generated multidimensional time-series data set may be split into a training set of multidimensional time-series data and a validation set of multidimensional time-series data. For example, the multidimensional time-series data set may be split on a specific date within the multidimensional time-series data set, with data prior to the split date being used as the training set and data on or after the split date being used as the validation set. The machine learning model may be trained based on the training set of multidimensional time-series data and validated based on the validation set of multidimensional time-series data.

Operations 300 proceed to block 330, with deploying the machine learning model.

Figure 4:
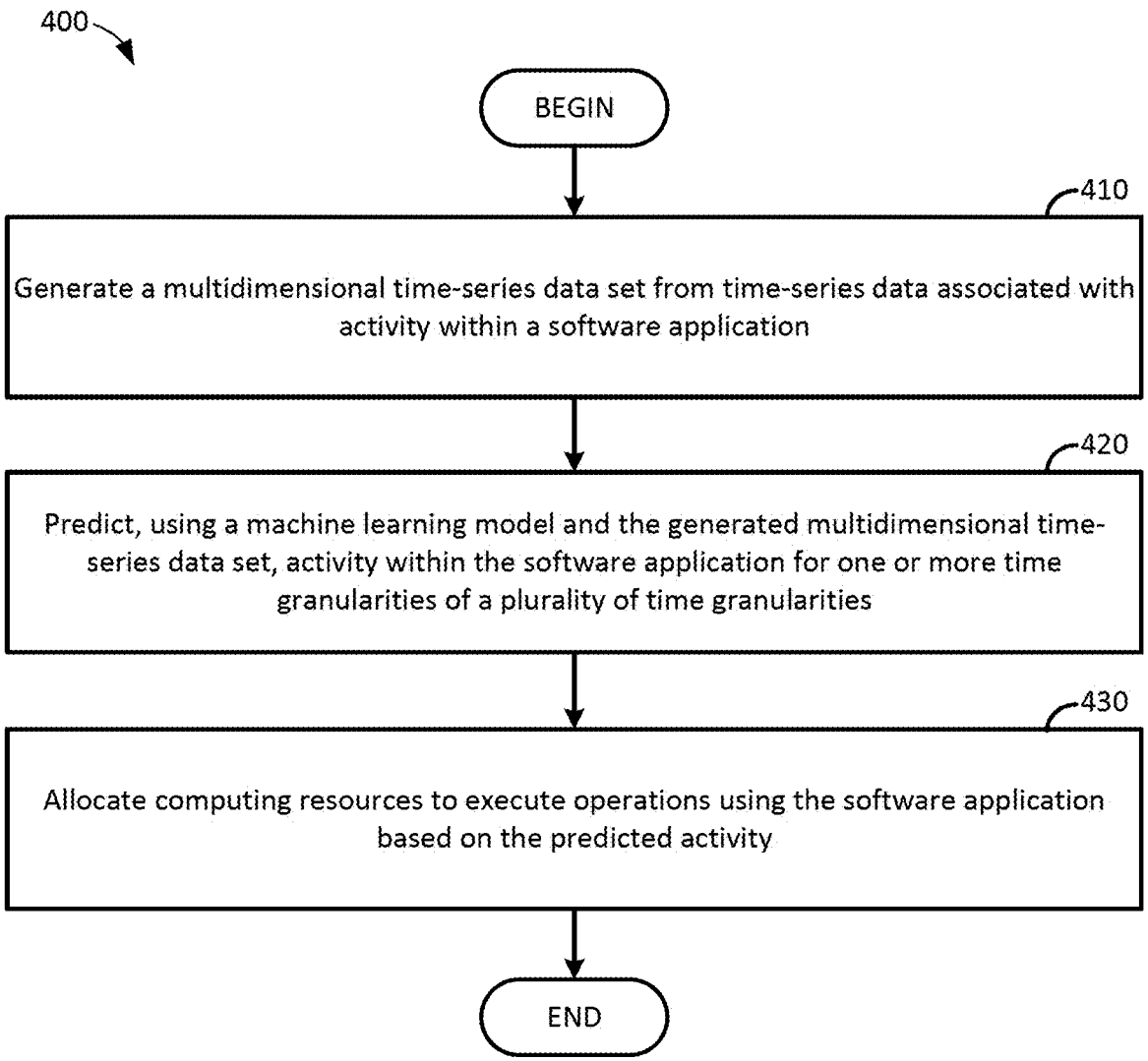
FIG. 4 illustrates example operations that may be performed by a computing system to predict activity within a software application based on a machine learning model and multidimensional time-series data, in accordance with aspects of the present disclosure.

FIG. 4 illustrates example operations 400 for predicting activity with a software application based on a machine learning model and multidimensional time-series data, in accordance with aspects of the present disclosure. Operations 400 may be performed, for example, by an activity predictor and resource allocator on an application server (e.g., activity forecaster 114 and resource allocator 116 of application server 110, illustrated in FIG. 1).

As illustrated, operations 400 begin at block 410, with generating a multidimensional time-series data set from time-series data associated with activity within a software application. Generally, the multidimensional time-series data set includes the time-series data organized based on a plurality of time granularities.

In some aspects, generating the multidimensional time-series data set may include partitioning the time-series data (which, as discussed above, may be one-dimensional time-series data including timestamps identifying when a specific action was invoked or otherwise performed within the software application) into a plurality of bins. Each bin may be associated with a period of time, according to a specific time granularity of the plurality of time granularities, within a larger time period. For example, as discussed above, each bin may be associated with a non-overlapping 30 minute window within a day, which may allow for a machine learning model to predict future activity within the software application on an intra-day and inter-day basis.

In some aspects, the multidimensional time-series data set may be structured as a three-dimensional data set. A first dimension in the three-dimensional data set may be associated with a daily time window. A second dimension in the three-dimensional data set may be associated with a time granularity for organizing the time-series data. A third dimension in the three-dimensional data set may be associated with the plurality of time granularities over which data is to be divided and analyzed by the machine learning model to predict intraday activity within the software application. In some aspects, data for each day in the daily time window may be associated with a plurality of features identifying a position of a day relative to one or more larger time windows. For example, the data for each day in the daily time window may include an index identifying the day of the week (e.g., as illustrated in FIG. 2, with Monday through Friday indexed as days 0 through 4, inclusive, and Saturday and Sunday indexed as days 5 and 6), an index identifying the week of the month in which the day is located, and an identifier of the month.

In some aspects, the multidimensional time-series data set comprises a plurality of feature maps, each feature map of the plurality of feature maps corresponding to a respective time granularity of the plurality of time granularities.

Operations 400 proceed to block 420, with predicting, using a machine learning model and the generated multidimensional time-series data set, activity within the software application for one or more time granularities of the plurality of time granularities.

Operations 400 proceed to block 430, with allocating computing resources to execute operations using the software application based on the predicted activity within the software application.

In some aspects, allocating the computing resources includes adjusting an allocation of computing resources based on differences between predicted activity within the software application between different segments of time according to one time granularity of the plurality of time granularities.

Example System for Activity Prediction Using Multidimensional Time-Series Data

Figure 5:
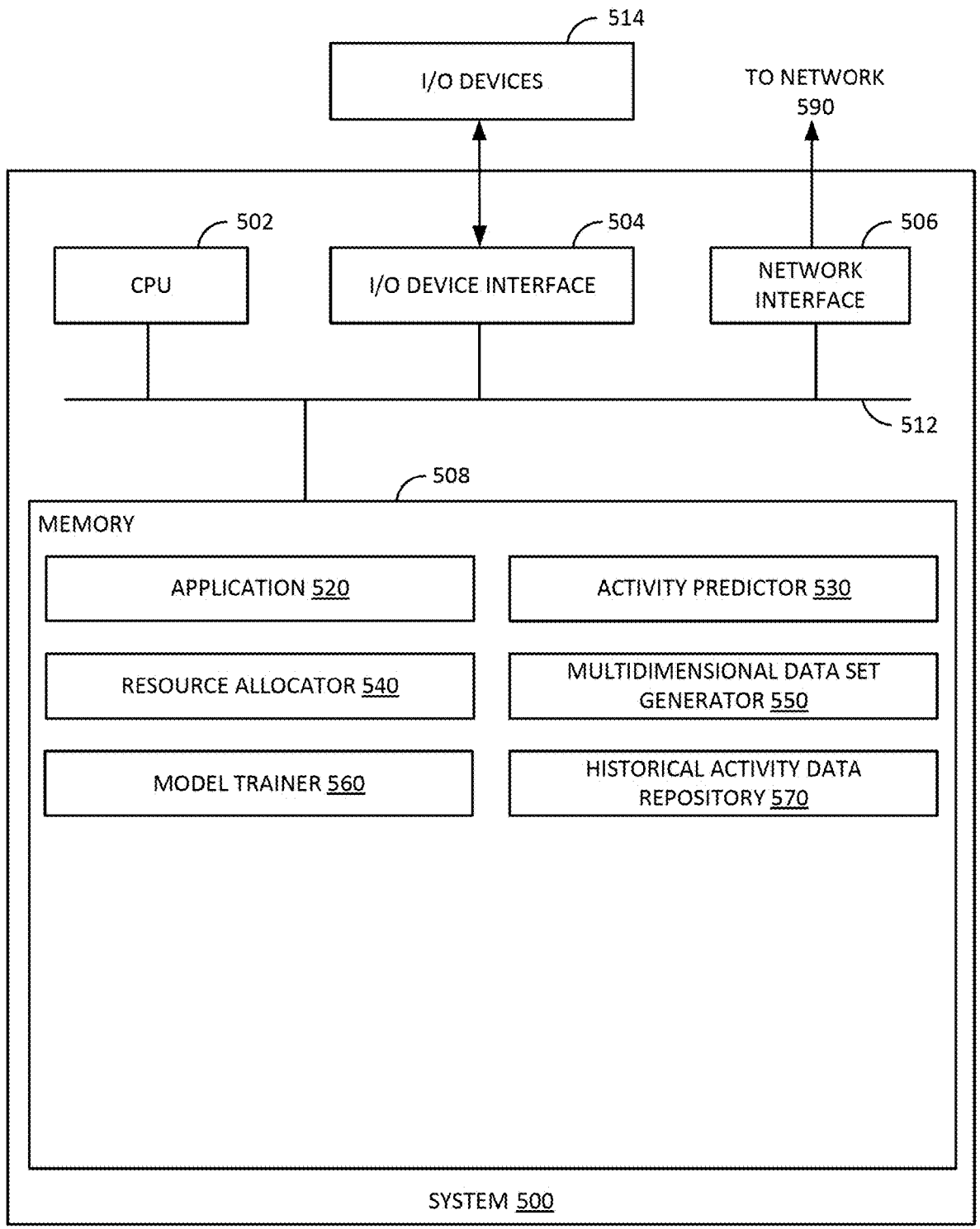
FIG. 5 illustrates a computing system on which aspects of the present disclosure may be performed.

FIG. 5 illustrates an example system 500 that performs activity prediction and resource allocation based on multidimensional time-series data. In one example, system 500 may correspond to application server 110 and model training system 120 illustrated in FIG. 1 or other computing devices which can train and use machine learning models to predict activity in a software application based on multidimensional time-series data.

As shown, system 500 includes a central processing unit (CPU) 502, one or more I/O device interfaces 504 that may allow for the connection of various I/O devices 514 (e.g., keyboards, displays, mouse devices, pen input, etc.) to the system 500, network interface 506 through which system 500 is connected to network 590 (which may be a local network, an intranet, the internet, or any other group of computing devices communicatively connected to each other), a memory 508, and an interconnect 512.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, and memory 508.

CPU 502 is included to be representative of a single CPU, multiple CPUs, a single CPU having multiple processing cores, and the like.

Memory 508 is representative of a volatile memory, such as a random access memory, or a nonvolatile memory, such as nonvolatile random access memory, phase change random access memory, or the like. As shown, memory 508 includes an application 520, activity predictor 530, resource allocator 540, multidimensional data set generator 550, model trainer 560, and historical activity data repository 560.

Application 520 may generally correspond to application 112 illustrated in FIG. 1. Application service 520 generally exposes a service through which client devices can execute various operations which may involve requesting access to computing resources provided by system 500 and/or remote computing resources. When such requests are received, application service 520 can process these requests using resources allocated to application by resource allocator 540.

Activity predictor 530 may generally correspond to activity predictor 114 illustrated in FIG. 1. Activity predictor 530 generally uses time-series data (e.g., stored in historical activity data repository 570, which may correspond to historical activity data repository 130 illustrated in FIG. 1) to predict future activity within application 520 on an intra-day and inter-day basis. To predict activity within application 520, activity predictor 530 can divide one-dimensional historical time-series data (e.g., a sequence of timestamps identifying times at which a specific activity was performed within application 520) into a multidimensional time-series data set, in which one dimension of the multidimensional time-series data set include different time granularities over which historical time-series data is organized. Activity predictor 530 uses a machine learning model (e.g., trained by model trainer 570) and the multidimensional time-series data set to predict inter-day and intra-day activity within application 520.

Resource allocator 540 may generally correspond to activity predictor 116 illustrated in FIG. 1. Resource allocator 540 generally uses the activity prediction generated by activity predictor 530 to allocate computing resources on system 500 and/or remote computing resources to process the activity expected to be generated by application 520. In allocating computing resources on system 500, resource allocator 540 can allocate or deallocate resources to application 520 based on differences between a currently allocated amount of resources and a projected amount of resources needed to perform the predicted activity in the next time window (e.g., a next intra-day time window). The amount of resources to be allocated during any time window may be based on a total amount of resources needed to perform the predicted activity and the percentage of daily activity expected to be performed within that time window.

Multidimensional data set generator 550 may generally correspond to multidimensional data set generator 122 illustrated in FIG. 1. Multidimensional data set generator 550 generally uses one-dimensional historical time-series data (e.g., stored in historical activity data repository 560) to generate a multidimensional data set used to train a machine learning model used by activity predictor 530 to predict activity within application 520.

Model trainer 560 may generally correspond to model trainer 124 illustrated in FIG. 1. Model trainer 560 generally uses the multidimensional data set generated by multidimensional data set generator 550 (e.g., split on a split date with data prior to the split date being used as a training set and data on or after the split date being used as a validation set) to train a machine learning model. The machine learning model may be, for example, a convolutional neural network trained to predict activity within a software application based on a multidimensional data set which may resemble a set of feature maps, with each feature map in the set corresponding to one of the plurality of time granularities into which time-series data is divided.

Example Clauses

Implementation details of various aspects of the present disclosure are described in the following numbered clauses.

Clause 1: A method, comprising: generating a multidimensional time-series data set from time-series data associated with activity within a software application, wherein the multidimensional time-series data set includes the time-series data organized based on a plurality of time granularities; training a machine learning model to predict future activity within the software application for one or more time granularities of the plurality of time granularities based on the generated multidimensional time-series data set; and deploying the machine learning model.

Clause 2: The method of Clause 1, wherein the machine learning model comprises a convolutional neural network trained to predict future activity within the software application based on the plurality of time granularities being one dimension in the multidimensional time-series data set.

Clause 3: The method of any of Clauses 1 or 2, wherein generating the multidimensional time-series data set comprises, for each time granularity of the plurality of time granularities, partitioning the time-series data associated with activity within the software application into a plurality of bins, each bin being associated with a period of time, according to the time granularity, within a larger time period.

Clause 4: The method of any of Clauses 1 through 3, wherein: the multidimensional time-series data set comprises a three-dimensional data set, a first dimension in the three-dimensional data set is associated with a daily time window, a second dimension in the three-dimensional data set is associated with time granularity for organizing the time-series data, and a third dimension in the three-dimensional data set is associated with the plurality of time granularities.

Clause 5: The method of Clause 4, wherein data for each day in the daily time window is associated with a plurality of features identifying a position of a day relative to one or more larger time windows.

Clause 6: The method of any of Clauses 1 through 5, wherein the multidimensional time-series data set comprises a plurality of feature maps, each feature map of the plurality of feature maps corresponding to a respective time granularity of the plurality of time granularities.

Clause 7: The method of any of Clauses 1 through 6, wherein training the machine learning model comprises: splitting the generated multidimensional time-series data set into a training set of multidimensional time-series data and a validation set of multidimensional time-series data; training the machine learning model based on the training set of multidimensional time-series data; and validating the machine learning model based on the validation set of multidimensional time-series data.

Clause 8: A method, comprising: generating a multidimensional time-series data set from time-series data associated with activity within a software application, wherein the multidimensional time-series data set includes the time-series data organized based on a plurality of time granularities; predicting, using a machine learning model and the generated multidimensional time-series data set, activity within the software application for one or more time granularities of the plurality of time granularities; and allocating computing resources to execute operations using the software application based on the predicted activity within the software application.

Clause 9: The method of Clause 8, wherein the machine learning model comprises a convolutional neural network trained to predict future activity within the software application based on the plurality of time granularities being one dimension in the multidimensional time-series data set.

Clause 10: The method of any of Clauses 8 or 9, wherein generating the multidimensional time-series data set comprises, for each time granularity of the plurality of time granularities, partitioning the time-series data associated with activity within the software application into a plurality of bins, each bin being associated with a period of time, according to the time granularity, within a larger time period.

Clause 11: The method of any of Clauses 8 through 10, wherein: the multidimensional time-series data set comprises a three-dimensional data set, a first dimension in the three-dimensional data set is associated with a daily time window, a second dimension in the three-dimensional data set is associated with time granularity for organizing the time-series data, and a third dimension in the three-dimensional data set is associated with the plurality of time granularities.

Clause 12: The method of Clause 11, wherein data for each day in the daily time window is associated with a plurality of features identifying a position of a day relative to one or more larger time windows.

Clause 13: The method of any of Clauses 8 through 12, wherein the multidimensional time-series data set comprises a plurality of feature maps, each feature map of the plurality of feature maps corresponding to a respective time granularity of the plurality of time granularities.

Clause 14: The method of any of Clauses 8 through 13, wherein allocating the computing resources comprises adjusting an allocation of computing resources based on differences between predicted activity within the software application between different segments of time according to one time granularity of the plurality of time granularities.

Clause 15: An apparatus comprising: a memory having executable instructions stored thereon; and a processor configured to execute the executable instructions to cause the apparatus to perform the operations of any one of Clauses 1 through 13.

Clause 16: An apparatus comprising: means for performing the operations of any one of Clauses 1 through 13.

Clause 17: A computer-readable medium having instructions stored thereon which, when executed by a processor, performs the operations of any one of Clauses 1 through 13.

Additional Considerations

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
    generating a multidimensional time-series data set from time-series data associated with activity within a software application, wherein the multidimensional time-series data set comprises;
        a first dimension that is associated with a first time granularity of a plurality of time granularities;
        a second dimension that is associated with a second time granularity of the plurality of time granularities; and
        a third dimension that is associated with two or more time granularities of the plurality of time granularities:
    training a convolutional neural network (CNN), using the multidimensional time-series data set, to predict future activity within the software application for one or more time granularities of the plurality of time granularities such that, as a result of the training, the CNN is configured to recognize relationships between activities across the first dimension, the second dimension, and the third dimension when provided with three-dimensional input data;
    and
    deploying the CNN.

2. The method of claim 1, wherein generating the multidimensional time-series data set comprises, for each time granularity of the plurality of time granularities, partitioning the time-series data associated with activity within the software application into a plurality of bins, each bin being associated with a period of time, according to the time granularity, within a larger time period.

3. The method of claim 1, wherein:
the first dimension is associated with a daily time granularity,
the second dimension is associated with a time of day granularity, and
the third dimension is associated with the plurality of time granularities.

4. The method of claim 3, wherein data for each day in the daily time granularity is associated with a plurality of features identifying a position of a day relative to one or more larger time windows.

5. The method of claim 1, wherein the multidimensional time-series data set comprises a plurality of feature maps, each feature map of the plurality of feature maps corresponding to a respective time granularity of the plurality of time granularities.

6. The method of claim 1, wherein training the CNN comprises:
splitting the generated multidimensional time-series data set into a training set of multidimensional time-series data and a validation set of multidimensional time-series data;
training the CNN based on the training set of multidimensional time-series data; and
validating the CNN based on the validation set of multidimensional time-series data.

7. A method, comprising:
generating a multidimensional time-series data set from time-series data associated with activity within a software application, wherein the multidimensional time-series data set comprises;
a first dimension that is associated with a first time granularity of a plurality of time granularities;
a second dimension that is associated with a second time granularity of the plurality of time granularities; and
a third dimension that is associated with two or more time granularities of the plurality of time granularities:
predicting activity within the software application for one or more time granularities of the plurality of time granularities using a convolutional neural network (CNN), wherein the CNN has been trained to recognize relationships between activities across the first dimension, the second dimension, and the third dimension when provided with three-dimensional input data; and
allocating computing resources to execute operations using the software application based on the predicted activity within the software application.

8. The method of claim 7, wherein generating the multidimensional time-series data set comprises, for each time granularity of the plurality of time granularities, partitioning the time-series data associated with activity within the software application into a plurality of bins, each bin being associated with a period of time, according to the time granularity, within a larger time period.

9. The method of claim 7, wherein:
the first dimension is associated with a daily time granularity,
the second dimension is associated with a time of day granularity, and
the third dimension is associated with the plurality of time granularities.

10. The method of claim 9, wherein data for each day in the daily time granularity is associated with a plurality of features identifying a position of a day relative to one or more larger time windows.

11. The method of claim 7, wherein the multidimensional time-series data set comprises a plurality of feature maps, each feature map of the plurality of feature maps corresponding to a respective time granularity of the plurality of time granularities.

12. The method of claim 7, wherein allocating the computing resources comprises adjusting an allocation of computing resources based on differences between predicted activity within the software application between different segments of time according to one time granularity of the plurality of time granularities.

13. A system, comprising:
a memory having executable instructions stored thereon; and
a processor configured to execute the executable instructions in order to cause the system to:
generate a multidimensional time-series data set from time-series data associated with activity within a software application, wherein the multidimensional time-series data set comprises;
a first dimension that is associated with a first time granularity of a plurality of time granularities;
a second dimension that is associated with a second time granularity of the plurality of time granularities; and
a third dimension that is associated with two or more time granularities of the plurality of time granularities;
predict activity within the software application for one or more time granularities of the plurality of time granularities using a convolutional neural network (CNN), wherein the convolutional neural network has been trained to recognize relationships between activities across the first dimension, the second dimension, and the third dimension when provided with three-dimensional input data; and
allocate computing resources to execute operations using the software application based on the predicted activity within the software application.

14. The system of claim 13, wherein in order to generate the multidimensional time-series data set, the processor is configured to cause the system to, for each time granularity of the plurality of time granularities, partition the time-series data associated with activity within the software application into a plurality of bins, each bin being associated with a period of time, according to the time granularity, within a larger time period.

15. The system of claim 13, wherein:
the first dimension is associated with a daily time granularity,
the second dimension is associated with a time of day granularity, and
the third dimension is associated with the plurality of time granularities.

16. The system of claim 13, wherein the multidimensional time-series data set comprises a plurality of feature maps, each feature map of the plurality of feature maps corresponding to a respective time granularity of the plurality of time granularities.

17. The system of claim 13, wherein in order to allocate the computing resources, the processor is configured to cause the system to adjust an allocation of computing resources based on differences between predicted activity within the software application between different segments of time according to one time granularity of the plurality of time granularities.

* * * * *